D. NICHOLS.
Seed-Planter.
No. 24,431.
Patented June 14, 1859.
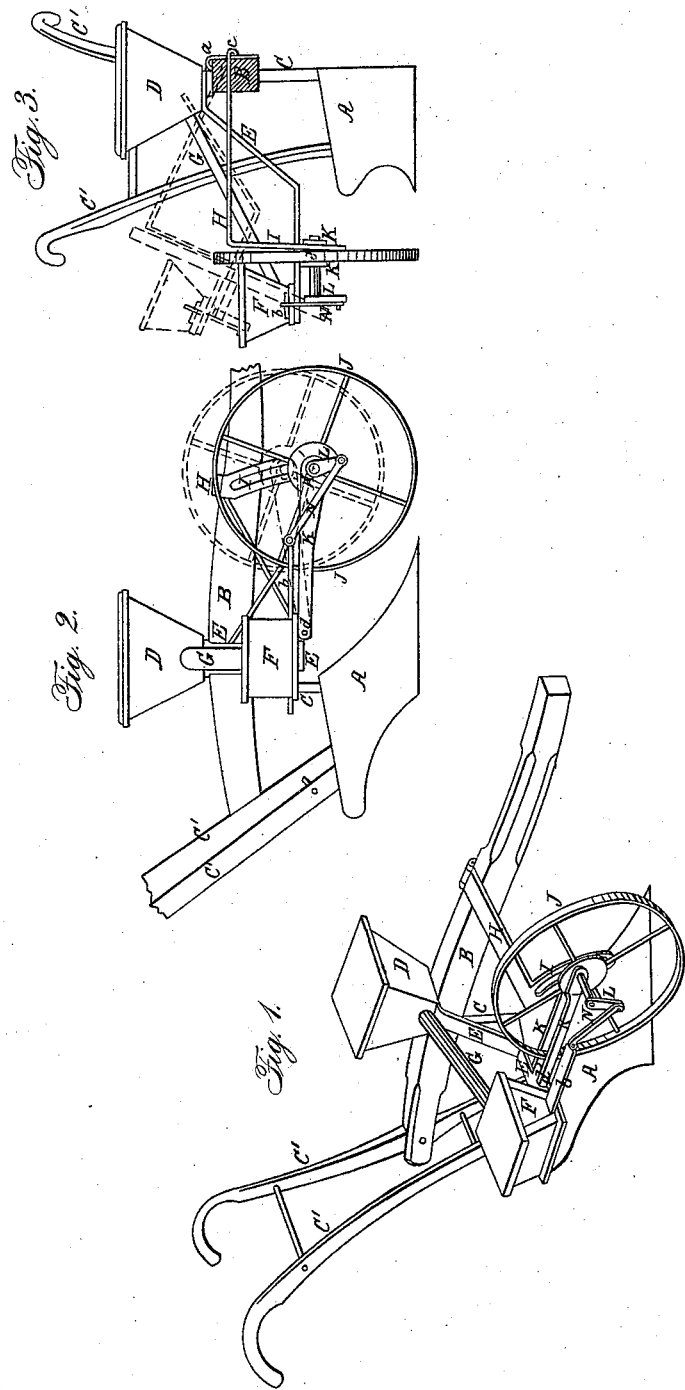
Witnesses:
Samuel Heuston
Daniel Lawrance
Inventor:
Daniel Nicols

UNITED STATES PATENT OFFICE.

DANIEL NICHOLS, OF ONARGA, ILLINOIS, ASSIGNOR TO CHARLES RUMLEY AND EDWD. RUMLEY, OF SAME PLACE.

IMPROVEMENT IN SEEDING-MACHINES.

Specification forming part of Letters Patent No. 24,431, dated June 14, 1859.

*To all whom it may concern:*

Be it known that I, DANIEL NICHOLS, of Onarga, in the county of Iroquois and State of Illinois, have invented a new and useful Improvement in Seed-Planter and Plow Combined; and I do hereby declare that the following is a full, clear, and exact description thereof, reference being had to the accompanying drawings, and to the letters of reference marked thereon, in which—

Figure 1 represents a perspective view of the several parts arranged for operation. Fig. 2 is a side view of the same, showing the driving-wheel in two positions. Fig. 3 is a front view, showing the seeding apparatus in two positions.

Similar letters of reference refer to like parts in the three figures.

The nature of my invention consists in combining with a plow a seed planter so arranged that it can be made adjustable according to the depth to which the seed is to be planted, at the same time adapting itself to the irregular surface of the ground and the motions of the plow in turning over the sod, described, represented, and specified as follows:

This invention is specially adapted to western lands, where the seed is planted under the sod, which is turned over upon it by a plow having a light draft, such as is represented by A in the drawings. This plow is fixed to the beam B by a standard, C, and is guided in its movements by handles C'. Immediately above the standard C is a seed-holder, D, which is fixed to a hinged bar, E, hinged to the land-side of the beam at *a*. This bar is bent down and proceeds from the side of the plow-beam in front of the mold-board, where it has fixed to it a seed-hopper, F, provided with a reciprocating slide, *b*, for dropping the seed in the usual manner. This hopper F is supplied from the seed-holder D by an inclined tube, G, communicating with both chambers.

H is a bar which is hinged to the beam at *c*, and proceeds therefrom parallel to bar E, and has a slotted arc, I, projecting down from its end, through which the axle of wheel J passes, serving as an adjustable brace for the wheel J, keeping it always parallel to the plow-beam. This wheel has its bearings in two swinging arms, K, which are pivoted at *d* to the hinged bar E. On the end of the axle of the wheel J is a crank-arm, L, to which is pivoted the connecting-rod N, and this rod being connected to the end of seed-slide *b* gives it the requisite motion for dropping the seed from hopper F as the machine is drawn forward.

The operation of this machine may be described as follows: The hopper D is filled with seed, which passes down through the tube G and supplies the hopper F as fast as the seed is dropped therefrom. The plow A turns over the sod at the desired depth, covering the seeds, which have been previously deposited in the ground from the hopper F. This hopper, being placed in front and to one side of the mold-board, as above shown, deposits the seeds so that they will be effectually covered or planted by the sod as it is turned by the plow.

The self-adjusting frame, composed of hinged bars E H, permits the seeding arrangement to be raised or lowered to a horizontal plane, and in connection with the adjustment of wheel J in slotted arc I. This wheel is kept running on the ground, however great be the inequalities of the surface, and thus the depositing of the seed from the hopper is regular and constant.

What I claim as my invention, and desire to secure by Letters Patent, is—

The combination and arrangement of hinged bars E H, slotted arc I, driving-wheel J, and auxiliary seed-hopper F, when the same are arranged and operating in the manner and for the purposes herein specified.

DANIEL NICHOLS.

Witnesses:
SAMUEL HEUSTON,
DANIEL LAURANCE.